3,318,845
POLYCARBONATE PREPARATION
Joseph J. Dietrich, Copley, and Henry C. Stevens, Akron, Ohio, assignors, by mesne assignments, to Pittsburgh Plate Glass Company
No Drawing. Filed June 12, 1958, Ser. No. 741,449
23 Claims. (Cl. 260—47)

This invention relates to the preparation of polycarbonates and is more particularly concerned with improved methods of obtaining high molecular weight aromatic polycarbonates. It is especially concerned with formation of bisphenol polycarbonates such as are obtained by phosgenation of alkylidene bisphenols.

Polycarbonates may be obtained, for example, by adding phosgene to a liquid medium formed by mixing an aromatic diol such as an alkylidene bisphenol (or other aromatic having two hydroxyl groups, e.g., two phenolic hydroxyl groups, linked directly to ring carbons), an aqueous alkali metal hydroxide solution and optionally but preferably a chemically inert water insoluble organic solvent for the polycarbonate.

An unattractive feature of such methods especially notable with alkylidene bisphenols such as Bisphenol A is the slowness with which high molecular weight polycarbonates are attained. Thus, prolonged stirring of phosgenated liquid reaction mixtures prior to realizing desirably high molecular weight polycarbonates is often the rule. This may entail stirring for ten hours or longer, up to several days. Manifestly, these lengthy stirring periods detract from efficient effective performance of the process. Uniformity and quality of the product is prone to vary.

According to this invention, high molecular weight polycarbonates may be prepared much more rapidly, often in the matter of several hours, e.g., one to three hours of post-phosgenation stirring. Thus, by virtue of this invention, it is possible to strikingly abbreviate the time consumed in formation of high molecular weight polycarbonates particularly in contrast to extended reaction periods of ten hours and longer. Quality and uniformity of polycarbonates are high.

It now has been discovered that the rate of high molecular weight polycarbonate formation is strikingly accelerated and other advantages as will hereinafter become more apparent are realized by phosgenating a reaction medium containing monophenate of an aromatic diol. Thus, it has been surprisingly found that by suitable adjustment of the alkalinity of a reaction medium (to which phosgene is added) the formation of high molecular weight polycarbonates may be accelerated. Proper alkalinity adjustment entails supplying only a fraction of the stoichiometrically required amount of alkali for formation of the diphenate salt of the aromatic diol.

"Monophenate of an aromatic diol" has reference to the condition provided by mixing in aqueous media one mole of aromatic diol with one mole of alkali metal hydroxide (sodium hydroxide) and may be stoichiometrically represented by:

MO—(Ar)—OH wherein Ar is an aromatic nucleus, notably a phenyl, diphenyl, alkylidene bisphenol group or the like. M represents a monovalent metal as sodium or potassium and both groups MO and OH are linked directly to the ring carbon of the aromatic nucleus. That is, the net result may be viewed as replacing one of the two hydroxyl hydrogens of the phenolic hydroxyl groups with a monovalent metal.

In general, mixing an aromatic diol with aqueous alkali metal hydroxide in the ratio of less than two moles of alkali metal hydroxide per mole of diol will establish a liquid medium containing monophenate of the aromatic diol. Depending upon the relative amount of alkali metal hydroxide, the portion of aromatic diol which for the purposes of the discussion here may be regarded as present as monophenate in the liquid medium will vary. When the amounts of aromatic diol and alkali metal hydroxide are equimolecular, the monophenate of the diol may be regarded as the principal form in which the aromatic diol is present. With the mole ratio of alkali metal hydroxide to aromatic diol less than unity, the liquid mixture will contain monophenate and aromatic diol (dissolved to the extent of its solubility). On the other hand, with alkali metal hydroxide and aromatic diol mixed in the ratio of between 1.1 and 1.9 moles of alkali metal hydroxide per mole of aromatic diol, the liquid mixture will be comprised largely of monophenate and diphenate of the aromatic diol.

Desirably, the reaction mixture as it is initially phosgenated contains in controlled amount sufficient alkali to provide for monophenate of the aromatic diol. In all probability, the reaction medium continues to contain monophenate of the diol throughout an appreciable portion of the phosgenation, usually at least about 30 percent and often up to 80 or 90 percent of the phosgenation period. At least in the performance of preferred embodiments hereof, the total amount of sodium hydroxide or like alkali incorporated in the reaction medium does not exceed two moles per mole of aromatic diol until at least such portion of the phosgene is added.

While most aromatic diols are essentially water insoluble, their corresponding phenates, including monophenates, are water soluble. Hence, the present invention which involves monophenate may be characterized as phosgenating or otherwise forming polycarbonates from a liquid reaction medium, the aqueous phase of which contains monophenate of the aromatic diol.

For preparation of many high molecular weight polycarbonates a heterogeneous liquid reaction medium, e.g., having immiscible phases, an organic phase and an aqueous phase, favorably influences the process. Heterogeneous liquid reaction media are useful for performing this invention with particular effectiveness.

Desirable heterogeneous liquid reaction media are established by including along with water (such as is provided by employing an aqueous alkali metal hydroxide solution) a chemically indifferent or inert water insoluble organic solvent which preferably is an especially good solvent for the polycarbonate product. Especially useful for this purpose are the essentially water insoluble, normally liquid, partially halogenated aliphatic hydrocarbons, notably chlorinated aliphatic hydrocarbons including chloroform, methyl chloride, methylene chloride, ethylene chloride, beta,beta'-dichloroethyl ether, acetylene dichloride, dichloroethylene and the partially chlorinated propanes and butanes. Partially halogenated (chlorinated) aliphatic hydrocarbons of one to four carbon atoms having at least one carbon atom linked to both a hydrogen and a halogen (chlorine) atom perform best. Other solvents include tetrahydrofuran, cyclohexanone. Other essentially water insoluble organic liquids, although not especially good polycarbonate solvents such as inert aromatics like benzene, xylene, toluene, chlorobenzenes and the like, may be used also.

Among the high molecular weight polycarbonates possessed of especially valuable properties are those derived from alkylidene bisphenols such as Bisphenol A. High molecular polycarbonates prepared by phosgenation of a reaction mixture formed from Bisphenol A, aqueous sodium hydroxide solution and a water insoluble organic solvent for the polycarbonate such as methylene chloride are exemplary. Structurally, they are represented by the formula:

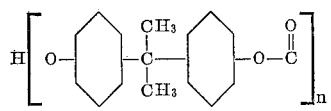

where $n$ is a large value, e.g., at least 20 to 300.

Effective rapid preparation of such aromatic high molecular weigh polycarbonates is possible by this invention. Other high molecular weight polycarbonates are also obtained with increased facility.

Illustrating the preparation of exemplary high molecular weight alkylidene bisphenol polycarbonates, a liquid medium initially formed with only sufficient alkali to provide for monophenate of the bisphenol is phosgenated. This typically entails charging to a jacketed reactor an appropriate water insoluble organic polycarbonate solvent (methylene chloride), and properly proportioned amounts of Bisphenol A and sodium hydroxide usually as an aqueous sodium hydroxide solution. By charging the reactor with less than two moles of sodium hydroxide, usually between 0.1 and 1.8 moles, per mole of bisphenol, the initial medium will be provided with monophenate of Bisphenol A.

Other expedients are in effect comparable to charging sodium hydroxide and Bisphenol A in the specified mole ratio. Hence, in lieu of charging these materials as such, the monophenate of bisphenol may be preformed, or sodium hydroxide and Bisphenol A may be mixed prior to being introduced into the reactor in the specified mole ratio and thereafter charged to the reactor as an aqueous system provided with monophenate of bisphenol and optionally properly proportioned amounts of both bisphenol and diphenate of bisphenol.

At least theoretically, the liquid reaction medium as initially established does not contain sodium hydroxide as such but rather as the phenates of bisphenol.

Once this reaction medium is established and contains an appreciable proportion, at least about 3 percent, and even all Bisphenol A as its monophenate, phosgene (gaseous or liquid) is gradually added, usually at a rate designed to complete the introduction of all phosgene in 30 to 200 minutes. Gentle agitation during phosgenation distributes the reactants and disperses the phases. Reaction temperatures are 0° C. to 50° C.

As a rule, 2.5 to 4.0 moles or more of sodium hydroxide per mole of Bisphenol A represent the total sodium hydroxide requirements for complete conversion of the Bisphenol A to product. Additional sodium hydroxide or like inorganic alkali is therefore added during the formation of polycarbonate and preferably during the phosgenation. The rate and amount of such addition, among other things, is related to the initial charge of alkali metal hydroxide and is so selected in preferred practices to maintain specific conditions as hereinafter are discussed in greater detail.

Essentially complete utilization (substantially complete conversion to polycarbonate) of the Bisphenol A charged to the reactor requires between about 1.0 and 1.3 moles of phosgene per mole of Bisphenol A. The rate of phosgene addition is, accordingly, regulated to add the requisite quantity over the course of 30 to 200 minutes. Thus, monophenate of Bisphenol A is provided initially by appropriate regulation of the ratio in which Bisphenol A and alkali metal hydroxide are mixed to establish the reaction medium to which phosgene is added at the outset. Until at least about 30 percent of the total phosgene requirement is added, the total amount of alkali metal hydroxide charged to the reaction medium is below 2 moles per mole of charged Bisphenol A.

According to one embodiment of this invention, the initial provision of the monophenate of Bisphenol A is accomplished by mixing Bisphenol A, methylene chloride or like organic solvent and a quantity of aqueous sodium hydroxide solution sufficient to establish the resulting mixture at a pH approximating 11. About 0.07 mole of sodium hydroxide per mole of Bisphenol A usually accomplishes this prior to commencing phosgenation. During phosgene addition which typically extends over 30 to 200 minutes, the reaction meduim is maintained in the pH range of about 10.8 to 11 by adding more sodium hydroxide or like alkali. The pH is regulated by continuous control until an appreciable portion of the total phosgene has been added, usually at least until after about 30 percent of the phosgene has been added. Thereafter, the balance of sodium hydroxide is charged in any convenient manner. It may be charged as rapidly as possible or control of the pH may be continued until no longer feasible (generally after about 60 percent of the phosgene addition is complete). Preferably, the entire balance of sodium hydroxide is added prior to completing the addition of phosgene.

In this embodiment, about 4 percent of the Bisphenol A is as monophenate in the initial reaction medium. The remaining Bisphenol A is largely undissolved. On the other hand, the monophenate is water soluble and undoubtedly is present in the aqueous phase.

Much larger proportions of the Bisphenol A may be initially provided as monophenate in the successful performance of this invention. Furthermore, any balance of the Bisphenol A may be present either as Bisphenol A or as diphenate.

Thus, according to a still further embodiment of the present invention, an initial reaction medium is established by forming a mixture of Bisphenol A, a suitable organic solvent such as methylene chloride and an aqueous solution of sodium hydroxide using between 1.1 and 1.5 mole of sodium hydroxide per mole of Bisphenol A. This is sufficient sodium hydroxide to provide the Bisphenol A in the form of a mixture of its mono- and diphenates. Using a ratio of 1.5 mole of sodium hydroxide per mole of Bisphenol A is tantamount to establishing in the initial reaction medium equimolecular proportions of the monophenate or Bisphenol A and the diphenate of Bisphenol A.

This medium is then phosgenated. Sometime prior to completing the phosgenation, usually when between 30 to 90 percent of the phosgene has been added, the balance of sodium hydroxide required is added. All the sodium hydroxide may be added at one time, or it may be added in several smaller portions.

In these embodiments, it is usual practice to gently stir the reaction mixture after completing the addition of phosgene. This stirring need only consume several hours, usually less than three hours and often one to two hours and at its conclusion the high molecular weight polycarbonates are provided.

The following examples illustrate the manner in which the present invention may be practiced:

EXAMPLE I

Into a five-necked, one liter glass flask, 68.4 grams (0.3 mole) of Bisphenol A (p,p'-isopropylidene bisphenol), 180 milliliters of methylene chloride and 100 milliliters of water were charged. A Beckman Zeromatic pH meter with a sleeve-type reference electrode and a standard glass electrode was properly inserted into the contents of the flask to measure the pH. Other necks of the flask were used to meter in gaseous phosgene and sodium hydroxide and to permit insertion of a paddle stirrer and thermometer.

The pH of the reaction mixture was then adjusted to pH 11 by charging 7 milliliters of 4 normal aqueous sodium hydroxide solution. This amount of sodium hydroxide is sufficient to convert about 4.5 percent of the Bisphenol A to its monophenate, thus initially providing for a reaction medium containing Bisphenol A monophenate and Bisphenol A. While the contents of the flask were stirred by rotating the stirrer at 300 revolutions per minute and held at 25° C. by cooling in an ice bath, 33.6 grams (0.34 mole) of gaseous phosgene was metered into the liquid medium over a period of 50 minutes at the rate of 0.66 gram per minute. Aqueous 4 normal sodium hydroxide was added in amounts and as required to maintain the reaction mixture at pH 10.8 to 11 throughout the first 33 minutes of the phosgene addition, in response to pH readings made with the pH meter. At this point, 50 milliliters of 4 normal sodium hydroxide solution was charged. The medium then emulsified.

The remaining amounts of phosgene and sodium hydroxide were added such that the end of their additions coincided. A total of 210 milliliters of 4 normal sodium hydroxide was charged. At the end of this period, the chloroformate chlorine content was below 0.001 percent by weight of the polycarbonate indicating obtention of high molecular weight product.

The emulsion which persisted throughout the stirring was then broken by addition of dilute hydrochloric acid, the organic phase separated, washed free of chloride ion, dried over anhydrous sodium sulfate and evaporated to obtain a Bisphenol A polycarbonate having a K-value of 53.

EXAMPLE II

Into a three-necked, one liter glass flask equipped with a paddle stirrer, 68.4 grams (0.3 mole) of Bisphenol A, 180 milliliters of methylene chloride, 100 milliliters of water and 105 milliliters of 4 normal aqueous sodium hydroxide solution were placed. Using this quantity of sodium hydroxide is tantamount to having the Bisphenol A dissolved in the aqueous phase as a mixture of monophenate and diphenate. The flask was immersed in an ice bath and during the reaction the temperature was maintained at 25° C.

With the stirrer operating at 300 revolutions per minute, a total of 33 grams (0.33 mole) of gaseous phosgene was added to the liquid mixture for 50 minutes at a uniform rate with the exception that at the midpoint of the phosgene addition flow was halted for about 3 to 5 minutes while 105 milliliters of 4 normal aqueous sodium hydroxide was added. After addition of this portion of sodium hydroxide, the reaction medium emulsified and phosgenation was continued.

After stirring the reaction mixture for 2 hours subsequent to concluding phosgene addition, the polycarbonate did not contain detectable chloroformate chlorine. Polycarbonate product recovered by the procedure of Example I had a K-value of 54.

On a larger scale, Example II was performed as follows:

EXAMPLE III

A twenty-gallon, jacketed, stirrer-equipped steel kettle was charged with 26.4 liters of water, 6.8 kilograms (30 moles) of Bisphenol A and 3.3 kilograms (42.0 moles) of aqueous sodium hydroxide solution containing 50.97 percent sodium hydroxide by weight. Using this amount of sodium hydroxide, a reaction mixture was established containing about 60 percent (18 moles) of the charged Bisphenol A as monophenate and the balance (12 moles) as diphenate of Bisphenol A. A nitrogen atmosphere was maintained on the kettle. After the Bisphenol A dissolved completely (and hence was converted to its mono- or diphenate form), the reaction mixture was cooled to 25° C. by circulating a coolant in the jacket. Then 18 liters of methylene chloride was added.

While maintaining the temperature at 25° C. and operating the stirrer at 120 revolutions per minute, 1.671 kilograms (approximately 17 moles) of gaseous phosgene was added at an essentially constant rate in 36 minutes. Flow of phosgene was then halted for 10 minutes while 3.4 kilograms (42.0 moles) of aqueous sodium hydroxide containing 50.91 percent NaOH by weight was quickly added, care being taken to maintain the temperature at 25° C. During this sodium hydroxide addition, the mixture emulsified. Phosgene flow was then resumed and 1.699 kilograms (approximately 17.0 moles) of additional phosgene was added in 50 minutes at an essentially constant rate.

After completing the phosgene addition, stirring and temperature control as performed during the phosgenation were continued for 2 hours during which time all chloroformate was reacted and formation of high molecular weight polycarbonate was completed. The emulsion was broken by addition of 36 liters of methylene chloride. The organic phase separated, water washed free of chloride ion and polycarbonate product precipitated as a granular material by addition of normal heptane to methylene chloride solution.

Results of Examples II and III may be duplicated by adding the second charge of sodium hydroxide after completing about 30, 40, 60, 70 or 80 percent of the total phosgene. More or less, sodium hydroxide, however, is initially charged. With the second charge added at 30 percent, only 30 percent of the sodium hydroxide is initially charged.

It will further be understood that inorganic alkali other than sodium hydroxide are useful. Inorganic alkali, especially water soluble alkali such as potassium hydroxide, lithium hydroxide, sodium carbonate or the like may be used in lieu of sodium hydroxide or in combination with one another.

According to this invention, the production of high molecular weight aromatic polycarbonates by the phosgenation of a reaction medium containing monophenate of an aromatic diol such as bisphenols is characterized by the low chloroformate chlorine content of the reaction medium throughout substantially the entire period of polycarbonate formation. Thus, throughout essentially the entire reaction an appreciable but low chloroformate chlorine concentration is present in the phosgenated reaction medium below about 2 percent, and usually below about 1 percent, by weight of the polycarbonate. Indicative, therefore, of effectively performing this invention is this low chloroformate chlorine content.

The following examples show the chloroformate chlorine concentration prevailing in the reaction mixture in the preparation of high molecular weight polycarbonates:

EXAMPLE IV

Into a five-necked one liter glass flask equipped with a paddle stirrer, 68.4 grams (0.3 mole) of Bisphenol A, 180 milliliters of methylene chloride and 100 milliliters of water were charged. A Beckman Zeromatic pH meter with a sleeve-type reference electrode range standard glass electrode was properly inserted into the contents of the flask to measure the pH. Other necks of the flask were used to meter in gaseous phosgene and sodium hydroxide and to permit insertion of the stirrer and thermometer.

The pH of the reaction mixture was then adjusted to pH 11 by charging 7 milliliters of 4 normal aqueous sodium hydroxide solution. Using this amount of sodium hydroxide was tantamount to converting about 4.5 percent of the Bisphenol A to its monophenate. While the flask was immersed in an ice bath and held at 25° C. and the stirrer operated at 300 revolutions per minute to stir the contents, 33.6 grams (0.34 mole) of gaseous phosgene was metered into the liquid medium over a period of 50 minutes at the rate of 0.66 gram per minute. Aqueous 4 normal sodium hydroxide was added in amounts and as required to maintain the reaction mixture at pH 10.8 to 11 throughout the first 33 minutes of the phosgene addition. At this point, 50 milliliters of 4 normal sodium hydroxide solution was charged. The reaction medium then emulsified.

After completing the addition of phosgene while concurrently slowly adding the balance of sodium hydroxide to coincide with the end of phosgene addition (a total of 210 milliliters of 4 normal sodium hydroxide solution), stirring is continued for 2 hours. At the end of this period, the chloroformate chlorine content was 0.001 percent by weight of the polycarbonate.

The emulsion which persisted throughout the stirring was then broken by addition of dilute hydrochloric acid, the organic phase separated, washed free of chloride ion, dried over anhydrous sodium sulfate and evaporated to obtain a Bisphenol A polycarbonate having a K-value of 53.

During the phosgene addition, samples were withdrawn periodically from the reaction medium varying in volume from 5 to 10 milliliters of the organic phase during the phosgene addition to 25 milliliters of the organic phase during the stirring period. When emulsions were encountered, a large sample, usually 50 milliliters, was removed and broken with dilute sulfuric acid.

After diluting the sample of organic phase, it was washed free of chloride ion using distilled water in a separatory funnel. This washed sample was then treated with 3 milliliters of pyridine in 40 milliliters of water and vigorously agitated for 5 minutes. It was then acidified with nitric acid and a standard Volhard titration was performed. The weight of the polycarbonate in the titrated sample was determined by treating the sample with concentrated ammonium hydroxide to dissolve any silver salt present before separation of the layers. The evaporation of the organic layer resulted in the isolation of residue which was dried and weighed. In this manner, the chloroformate chlorine concentration was:

*Table I*

| Minutes elapsed since the commencement of phosgene addition: | Chloroformate chlorine percent by weight of polycarbonate |
|---|---|
| 30 | 1.0 |
| 50 | 0.1 |

EXAMPLE V

Into a three-necked one liter glass flask equipped with a paddle stirrer, 68.4 grams (0.3 mole) of Bisphenol A, 180 milliliters of methylene chloride, 100 milliliters of water and 105 milliliters of 4 normal aqueous sodium hydroxide solution were placed. The flask was immersed in an ice bath and during the reaction, the temperature was maintained at 25° C.

With the stirrer operating at 300 revolutions per minute, a total of 33 grams (0.33 mole) of gaseous phosgene was added to the liquid mixture for 50 minutes at a uniform rate with the exception that at the midpoint of the phosgene addition flow was halted for about 3 to 5 minutes while 105 milliliters of 4 normal aqueous sodium hydroxide was added. After addition of this portion of sodium hydroxide, the reaction medium emulsified, and phosgenation was continued.

After stirring the reaction mixture for 2 hours subsequent to concluding phosgene addition, the polycarbonate did not contain detectable chloroformate chlorine. Polycarbonate product recovered by the procedure of Example I had a K-value of 55.

During the phosgene addition, samples were withdrawn periodically from the reaction medium and analyzed for chloroformate chlorine in the manner described in Example IV with the following results:

*Table II*

| Minutes elapsed since the commencement of phosgene addition: | Chloroformate chlorine percent by weight of polycarbonate |
|---|---|
| 12.5 | 0.0 |
| 25.0 | 0.0 |
| 37.5 | 0.2 |
| 50.0 | 0.5 |

Considerable latitude in various other reaction conditions is permissible. Temperatures which admit of maintaining a liquid reaction medium and which are below the boiling point of the organic solvent are generally suitable. Typical temperatures are from 0° C. to 50° C. Higher temperatures, e.g., above the normal boiling point of the solvent (or temperatures above that at which there is substantial solvent volatilization) are possible if recourse is had to sealed reactors or superatmospheric pressure.

The total amount of sodium hydroxide or like inorganic alkali used in the formation of any given polycarbonate basically exceeds stoichiometric. Used are 2.5 to 4.0 moles of sodium hydroxide or the mole equivalent of other inorganic alkali per mole of aromatic diol such as Bisphenol A.

A further consideration in best performing the process is the ratio of water and organic solvents. Between 0.3 and 1.5 volumes of organic solvent per volume of water are typical. Usually, sufficient organic solvent to establish a polycarbonate concentration of between 5 and 30 weight percent of the organic phase at the completion of polycarbonate formation suffices.

A wide variety of polycarbonates are effectively prepared by this invention. One of the noteworthy classes of polycarbonates are the alkylidene bisphenol polycarbonates exemplified by Bisphenol A polycarbonates. Accordingly, this invention is relevant to polycarbonates prepared by the phosgenation of the following and like alkylidene bisphenols:

(4,4'-dihydroxy-diphenyl)-methane
1,1-(4,4'-dihydroxy-diphenyl)-cyclohexane
2,2'-methylene bis(4-methyl-6-tertiary butyl phenol)
2,2'-methylene bis(4-ethyl-6-tertiary butyl phenol)
4,4'-butylidene bis (3-methyl-6-tertiary butyl phenol)
4,4'-thiobis(3-methyl-6-tertiary butyl phenol)
1,1-(4,4'-dihydroxy-3,3'-dimethyl-diphenyl)-cyclohexane
2,2-(2,2'-dihydroxy-4,4'-di-tert-butyl-diphenyl)-propane
3,4-(4,4'-dihydroxy-diphenyl)-hexane
1,1-(4,4'-dihydroxy-diphenyl)-1-phenyl-ethane
2,2-(4,4'-dihydroxy-diphenyl)-butane
2,2'-(4,4'-dihydroxy-diphenyl)-pentane
3,3'-(4,4'-dihydroxy-diphenyl)-pentane
2,2'-(4,4'-dihydroxy-diphenyl)-3-methyl-butane
2,2'-(4,4'-dihydroxy-diphenyl)-hexane
2,2'-(4,4'-dihydroxy-diphenyl)-4-methyl-pentane
2,2'-(4,4'-dihydroxy-diphenyl)-heptane
4,4-(4,4'-dihydroxy-diphenyl)-heptane
2,2-(4,4'-dihydroxy-diphenyl)-tridecane
2,2-bis(3,5-dichloro-4-hydroxy phenyl)-propane
2,2-bis(tetrachloro hydroxy phenyl)-propane
2,2-bis(3-chloro-4-hydroxy phenyl)-propane
2,2-bis(3,3'-dimethyl-4,4'-dihydroxy-diphenyl)-propane Moreover, the polycarbonates may be prepared using mixtures of two or more such alkylidene bisphenols.

Besides bisphenols, polycarbonates of polyhydroxy and notably dihydroxy benzenes or naphthalenes are susceptible of preparation. Typical compounds include: catechol, resorcinol, quinol, orcinol, mesorcinol, dihydroxyxylol, thymoquinol; naphthalene diols such as 1,3-dihydroxynaphthalene, 1,8-dihydroxynaphthalene, 1,6-dihydroxynaphthalene, 2,7-dihydroxynaphthalene; dihydroxydiphenyls such as 2,5-dihydroxydiphenyl, 2,2'-dihydroxydiphenyl, 2,4'-dihydroxydiphenyl, 3,3'-dihydroxydiphenyl, 4,4'-dihydroxydiphenyl, 3,4-dihydroxydiphenyl.

Mixed polycarbonates may also be prepared in the manner of this invention from combination of aromatic diols with various polyhydric, particularly aliphatic diols, or cycloaliphatic diols or aralkyl diols. Thus, a mixture of Bisphenol A or like alkylidene bisphenol and an aliphatic or cycloaliphatic diol may be simultaneously phosgenated to produce an essentially linear polycarbonate having alternating aromatic and aliphatic groups separated by carbonate linkages.

Illustrative cycloaliphatic diols are 1,2-cyclohexanediol, 1,3-cyclohexanediol, 1,4-cyclohexanediol, 1-methyl-cyclohexanediol-2,3, 1,2-cyclopentanediol, 1,3-cyclopentanediol, 3,3'-dihydroxydicyclopentyl ether, hydrogenated alkylidene bisphenols illustrated by 4,4'-dihydroxydicyclohexyl-2,2-propane and 1,2-dihydroxy-4-vinylcyclohexane.

Among the aliphatic dihydric compounds (aliphatic diols) are the saturated, acyclic dihydric alcohols (glycols), typical of which are ethylene glycol, propanediol-1,2, butanediol-1,3, butanediol-2,3, butanediol-1,2, butanediol-1,4, diethylene glycol, triethylene glycol, tetraethylene glycol, dipropylene glycol, tripropylene glycol, dibutylene glycol, tetrabutylene glycol, and olefinically unsaturated dihydric alcohols such as 3-butenediol-1,2. Polyglycols containing from 1 to 4 ether linkages and/or up to 12 carbon atoms as well as the corresponding thioglycols such as thiodiglycol, ethylene thiodiglycol are included. Aralkyl diols in which the hydroxyl groups are linked to the alkyl substituents are also useful in lieu of or in combination with the aliphatic or cycloaliphatic diols. These include xylylene glycols including phthalyl alcohol, metaxylylene glycol, paraxylylene glycol; the dimethylxylylene glycols such as alpha,alpha'-dihydroxydurene and styryl glycol.

In preparing mixed polycarbonates, i.e., polycarbonates derived both from an aromatic diol and a cycloaliphatic or aliphatic diol, the relative ratio in which the respective diols are employed is variable. By way of illustration, the aromatic diol may constitute between 25 and 90 mole percent of the diol mixture. Other polycarbonates may be derived from mixture of diols in which the aromatic diol comprises as low as 5 or 10 mole percent of all the diols.

While this invention has been described principally respecting phosgenation of aromatic diols alone or in admixture with other diols, bishaloformates and especially bischloroformates may be used. As an illustration, the bischloroformate of Bisphenol A may be used in lieu of or in admixture with phosgene to provide high molecular weight polycarbonates by reaction with a mixture of Bisphenol A and an alkali metal hydroxide solution. Mixed polycarbonates may be provided from diethylene glycol bischloroformate and Bisphenol A.

Accordingly, the invention here described is applicable to the preparation of polycarbonates by a type of reaction which may be viewed as directly or indirectly reacting (or consuming) a plurality of carbonic acid halide groups (preferably chloride) such as supplied by phosgene (or other carboxyl halide) or a bischloroformate (or other bishaloformate such as bromo, fluoro or iodoformates) and a plurality of hydroxyl groups at least a portion of which are provided directly or indirectly by an aromatic diol with the consequent formation of the multiplicity of carbonate linkages in the polycarbonate. Generalizing, this overall effect may be illustrated as:

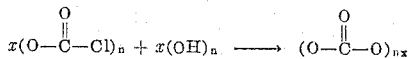

$n$ representing values of two or more and $x$ being a large value.

Viewed in this sense, formation of polycarbonates according to the process here concerned is the consequence of interreaction between polyfunctional compounds which contribute (directly or indirectly) reactive carbonic acid halides and phenolic hydroxyl groups.

Polycarbonates, for example, may be obtained from an aromatic diol and a bishaloformate of a diol by a reaction expressable as:

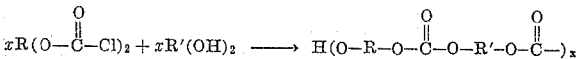

$x$ representing a large value, R and R' denoting either the same or different organic groups and R' being aromatic in character. In this fashion, an organic compound having a reactive hydroxyl group and a reactive carbonic acid halide group (e.g., a monochloroformate of an organic diol) may be used as the source of the groups which give rise to a plurality of carbonate linkages and hence a polycarbonate.

Nor is it essential that organic compounds having the carbonic acid halide groups be preformed. Instead, these groups may be in effect formed in situ. Thus, organic diols, notably bisphenols, when they are phosgenated (i.e., when phosgene is passed into an aqueous alkaline solution of a bisphenol) give rise to polycarbonates. This may be regarded as reaction of phosgene with alcoholic or phenolic hydroxyl groups in the presence of alkali which includes as an intermediate step formation of carbonic acid chloride (chloroformate) groups of the bisphenols.

This invention is applicable to formation of aromatic polycarbonates by this general type of reaction in which at least a portion of the hydroxyl groups are supplied by an aromatic diol, either as the aromatic diol itself or in its phenate form.

K-values reported herein were obtained by weighing 0.2500 gram of the polycarbonate into a 50 milliliter volumetric flask and then adding 25 milliliters of dioxane. Gentle heating on a steam bath with some shaking is used to obtain complete solution. After cooling to 25° C. and with enough dioxane to bring the level to the calibration mark on the volumetric flask, the solution is well mixed and filtered through a coarse fritted glass filter using a minimum of vacuum. The viscosity of the filtrate is determined by transferring 10 milliliters of the solution to a modified Ostwald viscosimeter which is placed in a constant temperature bath at 25° C. for 5 minutes. The efflux time at 25° C. is determined. The dioxane solvent is filtered and its efflux time is determined in the same manner. The relative viscosity is the ratio of the solution efflux time to the solvent efflux time. The log of the relative viscosity is determined and the K-value to which it corresponds is formed by reference to a graph which plots the relationship between known K-values and relative viscosities.

While the present invention has been described by reference to specific details of certain embodiments, it is not intended that the invention be construed as limited to such details except insofar as they are included in the appended claims.

We claim:
1. A method of preparing high molecular weight aromatic polycarbonate which comprises phosgenating an aqueous liquid reaction medium initially containing monophenate of an aromatic diol having two phenolic hydroxyl groups and thereafter adding further alkali so that it and the monophenate alkali together exceed stoichiometric for the formation of polycarbonate.

2. In the method of preparing high molecular weight aromatic polycarbonate by reaction in an aqueous liquid reaction medium of a plurality of carbonic acid halide groups and a plurality of hydroxyl groups at least a portion of which are phenolic hydroxyl groups of an aromatic diol having two phenolic hydroxyl groups, the improvement which comprises initially providing monophenate of the aromatic diol in the reaction medium and thereafter adding enough alkali to the medium so that it together with the monophenate alkali exceeds stoichiometric for the formation of polycarbonate.

3. The method of preparing high molecular weight aromatic polycarbonate which comprises phosgenating an aqueous liquid medium formed from an aromatic diol having two phenolic hydroxyl groups and alkali metal hydroxide, limiting throughout a substantial portion of the phosgenation period the amount of alkali metal hydroxide to less than 2 moles of alkali metal hydroxide per mole of aromatic diol and before completing the formation of high molecular weight polycarbonate adding further alkali metal hydroxide to the reaction medium until the total alkali metal hydroxide is between 2.5 and 4 moles per mole of aromatic diol.

4. In the method of preparing high molecular weight aromatic polycarbonate by reaction in an aqueous liquid medium of a plurality of carbonic acid halide groups and a plurality of hydroxyl groups including phenolic hydroxyl groups of an aromatic diol having two phenolic hydroxyl groups, the improvement which comprises conducting a substantial portion of the reaction in a liquid medium initially formed from aromatic diol and an alkali metal hydroxide in the mole ratio of less than 2 moles of alkali metal hydroxide per mole of aromatic diol and prior to completing the preparation of high molecular weight polycarbonate adding further alkali metal hydroxide so that the total alkali metal hydroxide is in excess of 2 moles of hydroxide per mole of aromatic diol.

5. The method of claim 4 where the mole ratio is from 0.1 to 1.8 moles of alkali metal hydroxide per mole of aromatic diol.

6. The method of preparing high molecular weight aromatic polycarbonate which comprises phosgenating an aqueous liquid medium formed from an alkylidene bisphenol and an alkali metal hydroxide, the ratio of alkali metal hydroxide to alkylidene bisphenol being less than 2 to 1 for a substantial portion of the phosgenation and after completion of a substantial portion of the phosgenation incorporating in the reaction medium further alkali metal hydroxide so that the total mole ratio of alkali metal hydroxide to bisphenol exceeds 2 to 1.

7. The method of preparing high molecular weight aromatic polycarbonate which comprises phosgenating an aqueous liquid medium of an aromatic diol having two phenolic hydroxyl groups and an alkali metal hydroxide and maintaining the liquid medium at a pH of about 10.8 to 11 for a substantial portion of the phosgenation period.

8. The method of preparing high molecular weight aromatic polycarbonate which comprises phosgenating an aqueous liquid medium initially containing monophenate of an aromatic diol having two phenolic hydroxyl groups and diphenate of an aromatic diol having two phenolic hydroxyl groups and subsequent to commencing phosgenation adding sufficient alkali so that the total of it and phenate alkali exceeds stoichiometric for the formation of polycarbonate.

9. The method of preparing high molecular weight aromatic polycarbonate which comprises phosgenating an aqueous liquid medium formed from aromatic diol having two phenolic hydroxyl groups and alkali metal hydroxide in the mole ratio of more than 1 mole and up to 1.5 moles of alkali metal hydroxide per mole of aromatic diol and prior to completing phosgenation adding further alkali metal hydroxide so that the total of alkali metal hydroxide is 2.5 to 4 moles per mole of aromatic diol.

10. In the method of preparing high molecular weight aromatic polycarbonate which comprises phosgenating an aqueous liquid medium formed from an aromatic diol having two phenolic hydroxyl groups and alkali metal hydroxide wherein a total of 2 moles of alkali metal hydroxide per mole of aromatic diol are stoichiometrically required for polycarbonate formation, the improvement which comprises limiting the initial amount of alkali metal hydroxide to well below stoichiometric and adding further alkali to supply at least the balance of the stoichiometric requirements at a rate such that an appreciable chloroformate chlorine concentration up to about 2 percent by weight of the organic substituents is maintained in the liquid medium substantially throughout the phosgenation.

11. The method of preparing high molecular weight aromatic polycarbonate which comprises phosgenating an aqueous liquid medium initially formed from an alkylidene bisphenol and less than 2 moles of alkali metal hydroxide per mole of bisphenol, water and a water insoluble organic solvent for the polycarbonate and adding further alkali metal hydroxide to provide a total amount of alkali metal hydroxide which exceeds 2 moles per mole of bisphenol at a rate so as to maintain an appreciable chloroformate chlorine concentration in the reaction mixture up to about 2 percent by weight chloroformate chlorine by weight of the organic phase substantially throughout the phosgenation.

12. The method of preparing high molecular weight aromatic polycarbonate which comprises initially adding phosgene to a liquid medium of an aromatic diol having two phenolic hydroxyl groups and alkali, the amount of alkali being only a fraction up to 90 percent of that stoichiometrically required for formation of all the diol as its diphenate salt, after adding at least 30 percent of the phosgene requirement but prior to concluding the addition of phosgene adding alkali to the reaction medium and completing the addition of phosgene requirement.

13. In the method of preparing high molecular weight aromatic polycarbonate by the phosgenation of aromatic diol, the improvement which comprises adding phosgene to a liquid body of an aromatic diol having two phenolic hydroxyl groups and alkali metal hydroxide, limiting the amount of alkali metal hydroxide in the liquid medium to which phosgene is added initially to but a fraction up to 90 percent of that stoichiometrically required for formation of all the aromatic diol as its diphenate salt and adding further alkali metal hydroxide after adding at least 30 percent of the phosgene requirement but prior to completing the phosgene addition.

14. In the method of preparing high molecular weight aromatic polycarbonate by phosgenation of an alkylidene bisphenol, the improvement which comprises adding phosgene to a liquid medium of the bisphenol and alkali metal hydroxide, limiting the alkali metal hydroxide in the liquid medium to which phosgene is initially added to between 0.1 and 1.8 moles per mole of bisphenol and less than that stoichiometrically required for formation of all the bisphenol as its diphenate salt and adding alkali metal hydroxide to the medium after adding at least 30 percent of the phosgene requirement but prior to completing the phosgene addition.

15. In the method of phosgenating p,p'-isopropylidene bisphenol to obtain high molecular weight polycarbonate, the improvement which comprises adding phosgene to a liquid medium of p,p'-isopropylidene bisphenol and alkali metal hydroxide, limiting the alkali metal hydroxide in the medium to which phosgene is initially added to more than 0.1 but not in excess of 1.9 moles of alkali metal hydroxide per mole of p,p'-isopylidene bisphenol and adding further alkali metal hydroxide to the medium after adding at least 30 percent of the phosgene requirement but prior to completing the phosgene addition.

16. The method of claim 15 wherein the amount of alkali metal hydroxide in the medium to which phosgene is initially added provides for at least about 3 percent by weight of the Bisphenol A present as its monophenate.

17. The method of claim 15 wherein the amount of alkali metal hydroxide is limited to between 1.1 and 1.9 moles of alkali metal hydroxide per mole of bisphenol.

18. A process for preparing substantially linear, thermoplastic polycarbonate resins which comprises reacting a di(monohydroxy-phenyl)-substituted aliphatic hydrocarbon, in which both hydroxy-phenyl groups are attached to the same carbon atom, with phosgene in the presence of an alkali metal hydroxide, said alkali metal hydroxide being present in an amount sufficient to impart to the reaction system a pH value between about 10.8 to 11.

19. A process for preparing a substantially linear, thermoplastic polycarbonate resin which comprises reacting phosgene with a (4,4'-dihydroxy-diphenyl)-alkane having both hydroxy-phenyl groups attached to the same carbon atom in an inert organic solvent medium and in the presence of an aqueous alkali metal hydroxide solution, said alkali metal hydroxide being present in an amount sufficient to impart to the reaction system a pH value between about 10.8 and about 11.

20. A process according to claim 19 in which the (4,4'-dihydroxy-diphenyl)-alkane has the general formula

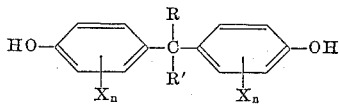

wherein R and R' are each selected from the group consisting of hydrogen and alkyl groups, X is selected from the group consisting of halogen and alkyl groups and $n$ is a numeral having a value of from 0 to 2.

21. A process according to claim 20 wherein R and R' are each methyl groups and $n$ has a value of zero.

22. A process for preparing a substantially linear, thermoplastic polycarbonate resin which includes the steps of forming a mixture consisting essentially of water, a bisphenol having the general formula

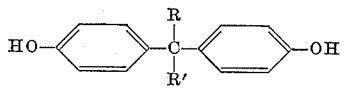

wherein R and R' are each selected from the group consisting of hydrogen and alkyl groups, the double alkali metal salt of said bisphenol, and an inert organic solvent for phosgene, said bisphenol and the said double salt thereof being present in proportions whereby the pH of said mixture is in the range of about 10.8 to about 11, contacting said mixture with phosgene at a temperature between about 20° C. and 30° C., while maintaining the pH of the reaction system substantially within the aforesaid range by simultaneous addition of an alkali metal base until substantially all of the bisphenol is phosgenated.

23. A process according to claim 22 in which the bisphenol employed is 2,2(4,4'-dihydroxy-diphenyl)-propane and the inert organic solvent is methylene chloride.

References Cited by the Examiner

UNITED STATES PATENTS 2,970,131   1/1961   Moyer et al. _____ 260—47

FOREIGN PATENTS 532,543   10/1954   Belgium.
1,007,996   5/1957   Germany.

OTHER REFERENCES

Schnell: Angew. Chemie, 68, 633–640 (1956). Copy in Library.

WILLIAM H. SHORT, *Primary Examiner.*

H. N. BURSTEIN, M. STERMAN, M. GOLDSTEIN,
*Assistant Examiners.*